J. D. NIX.
HARVESTERS.
No. 195,038.
3 Sheets—Sheet 1.
Patented Sept. 11, 1877.
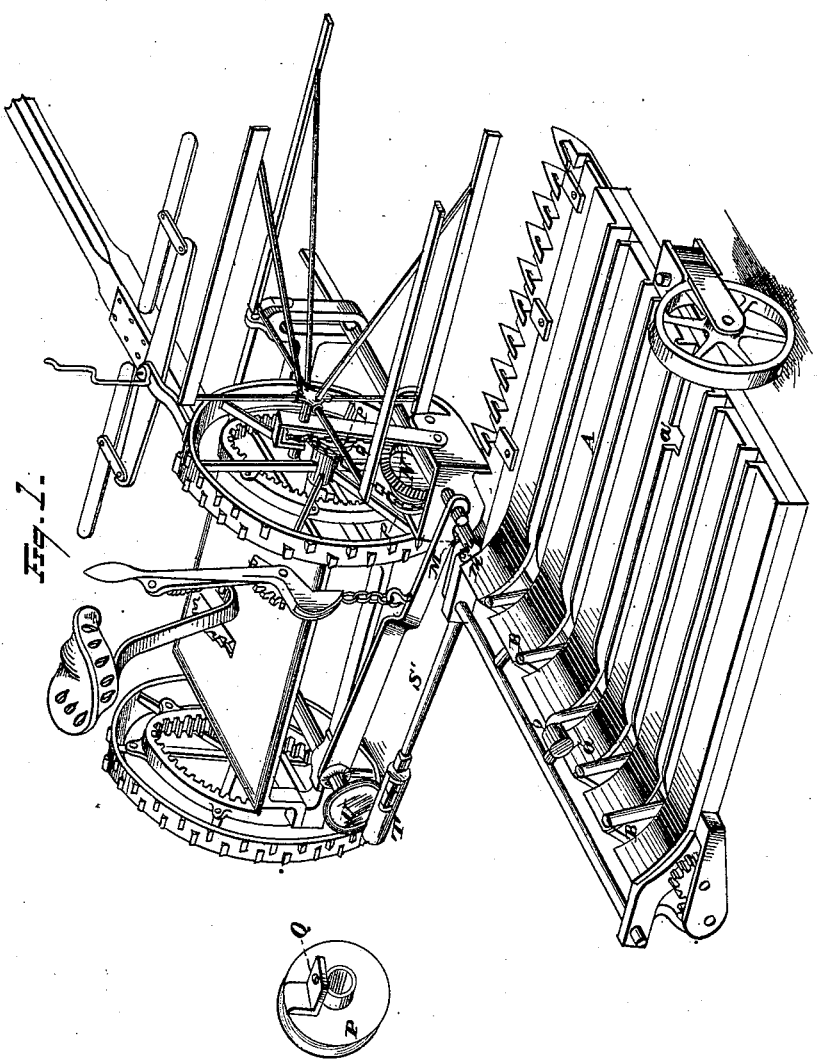
WITNESSES
Ed. J. Nottingham
A. W. Bright.
INVENTOR
John D. Nix.
By Leggett & Leggett,
ATTORNEYS

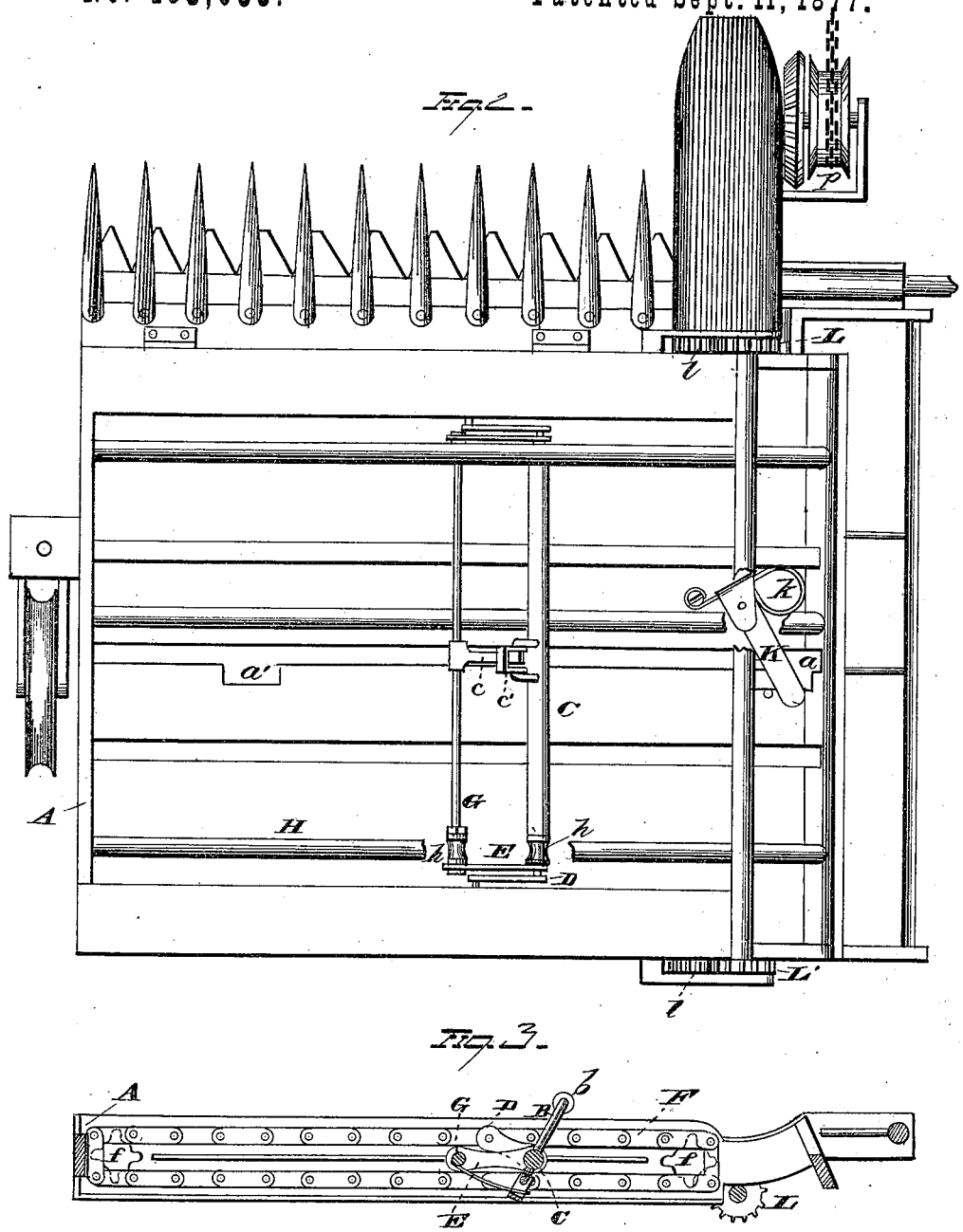

3 Sheets—Sheet 3.
J. D. NIX.
HARVESTERS.
No. 195,038. Patented Sept. 11, 1877.
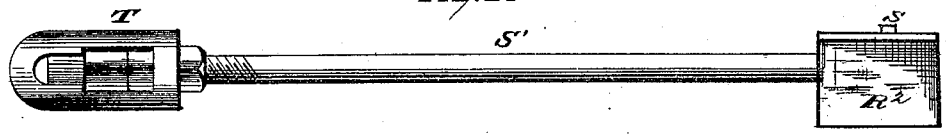
Fig. 4.
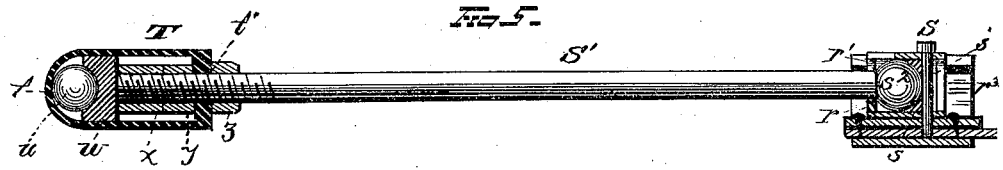
Fig. 5.
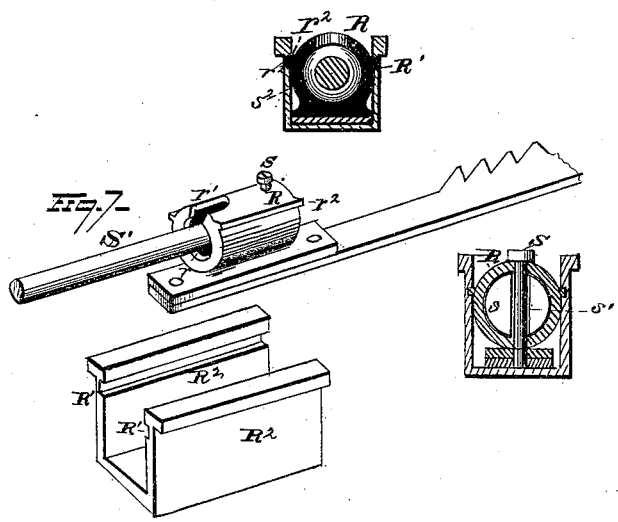
Fig. 6.
Fig. 7.
WITNESSES
Ed. I. Nottingham
A. W. Bright
INVENTOR
John D. Nix.
By Leggett and Leggett.
ATTORNEYS

UNITED STATES PATENT OFFICE.

JOHN D. NIX, OF MOUNT VERNON, ILL., ASSIGNOR OF TWO-THIRDS HIS RIGHT TO WILLIAM D. TABB AND GEORGE M. HAYNES, OF SAME PLACE.

IMPROVEMENT IN HARVESTERS.

Specification forming part of Letters Patent No. 195,038, dated September 11, 1877; application filed June 28, 1877.

*To all whom it may concern:*

Be it known that I, JOHN D. NIX, of Mount Vernon, in the county of Jefferson and State of Illinois, have invented certain new and useful Improvements in Reaping and Mowing Machines; and I do hereby declare the following to be a full, clear, and exact description of the invention, such as will enable others skilled in the art to which it pertains to make and use it, reference being had to the accompanying drawings, which form part of this specification.

My invention relates to improvements in mowers and reapers combined; and consists of two main portions, one having special reference to an automatic rake operating in connection with a table and bundle box or dropper, and the second to the pitman-connection with the crank-wheel and cutter-bar.

My object, in the first instance, is to construct the rake with teeth, which, upon reaching the end of their delivery-throw, will be reversed in their line of inclination by a catch-spring. This folds the rake backward, and it is carried in return movement beneath the table, till allowed to rise into its former position with its teeth projecting through the longitudinal slots in the table. It then repeats the former operation of raking the grain into the bundle-box, and the peculiar means for carrying the above into operation is set forth at length in the following description.

My second matter of improvement consists in the manner of connecting the pitman with, respectively, the crank-wheel and the cutter-bar, so that the length of the pitman is readily adjustable, and all lost motion can be easily taken up or compensated.

It consists of a ball-and-socket joint at either end connection, so as to give the pitman a universal-joint movement, that at the cutter-bar connection provides a ball rigidly attached to the pitman, and which works in a box secured to the end of the cutter-bar, and is followed by a semi-spherical cap, which latter is held in place by a screw or key. The opposite end of the pitman is screw-threaded, and engages with a box-coupling, which is operated by a wrist-ball on the crank-wheel. A suitable loose cap-bearing between the pit- man and this wrist-ball, gives end thrust to the former; and jam-nuts are used, securing the pitman from accidental displacement, and especially for drawing it tighter in taking up lost motion.

The cutter-bar pitman-head is made with side flanges or projections, which work in corresponding grooves in the sill-guides, and are designed to prevent any tendency to twist or dislocate the operating parts.

Referring to the drawings, Figure 1 is a perspective view of a machine representing the essential parts of my improvement. Fig. 2 is a reverse plan of the raking-table detached. Fig. 3 is a longitudinal sectional elevation of the same. Fig. 4 is a detached view of the pitman with its connections, and Fig. 5 is a central longitudinal section of the same. Fig. 6 is a cross-section, through the pitman-head, of the pitman-connection with the cutter-bar, and the guides between which it works. Fig. 7 represents, in detached views, the pitman-coupling with the cutter-bar.

The raking-table A is made with longitudinal slots, through which project the rake-teeth B, secured right-angularly on the rake-head C. The latter is loosely jointed at both extremities to the two lever-arms D and E. The former connect it with, respectively, the endless chains F, one at either side of the table, and which pass over suitable chain-pulleys $f$ in their movement. The inner arms E connect the rake-head with the spring-pressure rod G. The latter is provided with a central spring, $c$, which engages with the rake-head by the bow-coupling $c'$ swinging upon it. Its action tends to constantly urge the rake-head C to rock away from the grain side of the table, thus causing the rake-teeth to incline toward the bundle-box in proper line of inclination, to well gather the grain, and sweep it off the table.

Both rake-head C and rod G are provided with anti-friction wheels $h$, which travel upon suitable guide-rods H.

The rake is preferably made with a set of five teeth, and the table with a corresponding number of longitudinal slots or openings, in which the teeth work. The central tooth is provided with a roller, $b$, which gives easy travel to the rake as the latter is carried in return movement beneath the table, and bears up against the central strip-body of the latter. Openings $a\ a'$ are made at suitable positions in the bed of the table, to permit the passage through them of this roller, and under the respective actuation of the spring $g$ (before described) and the spring $k$ (immediately to be described) the roller is carried through either end opening $a\ a'$, as the rake-head, together with the rake-teeth, is correspondingly operated. This spring $k$ operates the lever-arm K, which engages the central rake-tooth as the rake reaches the end of its delivery-stroke, and retards the upper portion of the rake-teeth from further advancement, while the rake-head, being still carried on by the continuous movement of the endless chains, is rocked in its bearings, and the rake-teeth are changed from their former working inclination, and caused to fold backward. This brings the roller $b$ into coincidence with the opening $a$ at the delivery end of the table, and, passing through it, the rake is thrown or folded beneath the table, and carried in return line of direction back to the grain side. At the same time suitable mechanism automatically drops the bundle-box, delivers the grain upon the ground, and the box is prepared to repeat the operation of receiving and dropping the grain.

As the rake reaches the grain side of the table the opening $a$ allows the central tooth with its roller $b$ to pass up through it under the spring-pressed action of the rock-shaft; and the rake-teeth again assume position of working action in raking and delivering the grain.

Actuation is imparted to the endless chains as follows: Each of the two pulleys on the machine side of the table are journaled on shafts carrying pinions $l$, which latter mesh with gears L L', the two connected by a suitable rod or shaft.

Gear L is operated by spur $m$ on shaft M, the latter carrying a suitable pinion engaging with main bevel-gear N. The shaft of this large gear carries wheel $p$, connecting by chain with wheel P, the latter formed with a slotted projection, Q, which secures the wheel to, and allows it to be operated upon, the axle of the driving-wheel by the linchpin of the latter.

The second main portion of my invention, and which is applicable either to mowers or reapers, consists in construction as follows: The pitman coupling-box R is rigidly secured to the cutter-bar and is made with a socket, $r$, in its front end, which latter is also provided with a slot or opening, $r^1$, for the passage and free working of the pitman-rod.

Flanges or projections $r^2$, formed on either side of this box, slide in grooved ways $R^1$ of the sill-guides $R^2$. The object of such a construction is to prevent twisting of the sills, as any tendency to catch and break either the pitman or the sills is thus obviated.

The coupling-box R is made with an open rear end, $r^3$, which permits the loose cap or follower $s$ to be readily put in its place against the rear side of the ball $s^2$, which latter is formed on the pitman-rod S'.

The locking-groove $s^1$ is made on the rear side of the cap $s$ and receives any suitable key or pin, S, which secures the said cap against the pitman-ball. The side of this cap opposite to that formed with the locking-groove is made semi-spherical, to fit against said pitman-ball.

The pitman wrist-connection with the driving-wheel is also of a ball-and-socket-joint nature, and is adapted to readily adjust the length of the pitman in any desired degree.

It also co-operates with the pitman-coupling and adjusting-key in taking up all lost motion of the several working parts.

Pitman-box T has its outer end closed to form the bearing $t$ for one side of the spherical journal $u$ formed on the wrist-pin of the crank-wheel U. Its opposite end is provided with a screw-threaded slot, $t'$, through which the pitman-rod S' passes.

It is of form as shown, whereby the two jam-nuts $x\ y$ are placed within it and aid in taking up wear, the nut $x$ having face bearing against the removable block $w$, and the single nut $z$ bearing against the outer side of the inner end of the pitman-box.

By tightening nut $x$ against the removable block $w$, the latter is made to take up all wear between itself and the spherical journal $u$, without turning or handling the pitman-rod, so that in such case the jam-nuts need only be operated in action to compensate for wear at this pitman-connection with the crank-wheel.

Having fully described my invention, what I claim as new, and desire to secure by Letters Patent, is—

1. In a self-raker, adapted to fold beneath the table during its return movement, the combination, with the rake-tooth, provided with a loose anti-friction roller, of a corresponding body-strip of the table, constructed with an opening at both extremities suitable for the passage of the said roller-tooth, substantially as described.

2. The combination, with the rake-head, of the two lever-arms loosely connected to both its extremities, and respectively engaging it with the endless chains and the spring carrying-bar, substantially as described.

3. The combination, with the rake-head, connecting lever-arms, and spring carrying-bar, of the spring mechanism engaging the said rake-head and inclining the teeth forward during their delivery-stroke, substantially as described.

4. The combination, with the spring-pressed rake-head and rake-teeth, of the spring lever-catch, adapted to engage one of the said rake-teeth, preparatory to the return movement of the rake beneath the table, substantially as described.

5. The combination, with the spring lever-catch secured to the bottom of the grain-table at its delivery side, of the rake, the spring carrying-bar, and the connecting spring mechanism, substantially as described.

6. In an automatic rake, the combination, with the endless-chain pulleys and pinion-shafts, of the shafting extending across the grain-delivery end of the raking-table, and operated by the single gearing-spur, substantially as described.

7. The combination, with the bevel-gear actuating the automatic rake through connections, as described, of the chain-pulley, secured to the axle of the driving-wheel and intermediate mechanism, the said chain-wheel formed with a slotted projection, whereby it may be connected with, and operated by, the linchpin of the said driving-wheel, substantially as described.

8. In a pitman-coupling, the combination, with the box having the open tubular end extending across its entire vertical area, of the loose cap, fitting within the same, and provided with the transverse open groove, in which a suitable key has partial lateral bearing, substantially as described.

9. In a pitman-coupling, the combination, with the box made as described, and provided with lateral studs or projections, of the vertical sill-guides, formed one on either side thereof, and made with the upper longitudinal grooves, in which the said box-studs have sliding movement, substantially as described.

10. The combination, with a crank-wheel provided with a wrist-pin, constructed with a spherical journal, of a slotted pitman-box, the outer end of which is closed to serve as a bearing for one side of the wrist-pin journal, the removable block formed with a semi-spherical bearing, the two jam-nuts, adapted to be operated within the pitman-box, and the single jam-nut bearing against the outer side of the said box, substantially as described.

In testimony that I claim the foregoing I have hereunto set my hand this 12th day of June, 1877.

JOHN DAY NIX.

Witnesses:
L. H. DAVISSON,
T. M. GRAY.